United States Patent [19]

Field et al.

[11] 3,878,310

[45] Apr. 15, 1975

[54] TREATMENT OF BEVERAGES TO CLARIFY AND TO PREVENT HAZE

[75] Inventors: Nathan D. Field, Allentown; Edwin M. Smolin, Easton; Willis G. Thomas, Jr., Bethlehem; Earl P. Williams, Pen Argyl, all of Pa.

[73] Assignee: GAF Corporation, New York, N.Y.

[22] Filed: Apr. 15, 1971

[21] Appl. No.: 134,500

Related U.S. Application Data

[63] Continuation-in-part of Ser. No. 736,297, June 12, 1968, abandoned.

[52] U.S. Cl............................... 426/422; 426/330
[51] Int. Cl.............................................. C12h 1/04
[58] Field of Search .......... 99/48; 260/80.3 N, 88.3; 210/54; 426/11, 16, 336, 422

[56] References Cited
UNITED STATES PATENTS

| | | | |
|---|---|---|---|
| 2,947,633 | 8/1960 | Perry et al. | 99/48 |
| 3,146,107 | 8/1964 | Elder et al. | 99/48 X |
| 3,214,370 | 10/1965 | Bailey, Jr. et al. | 210/54 |
| 3,216,983 | 11/1965 | Shelanski et al. | 99/48 X |
| 3,294,765 | 12/1966 | Hort et al. | 260/80.3 |

*Primary Examiner*—David M. Naff
*Attorney, Agent, or Firm*—Walter C. Kehm; Martin A. Levitin

[57] ABSTRACT

Beverages such as juices, vinegars, beers and wines are clarified and rendered haze-free by contacting the beverages with water-insoluble, water-swellable, cross-linked N-vinyllactam or N-alkyl-N-vinylamide polymers in the form of porous granules or beads. The granules or beads when spent are regenerated by an aqueous alkaline treatment.

12 Claims, No Drawings

TREATMENT OF BEVERAGES TO CLARIFY AND TO PREVENT HAZE

This application is a continuation-in-part of U.S. Pat. application, Ser. No. 736,297 filed June 12, 1968 now abandoned.

The present invention is directed to a process for improving vegetable beverages, e.g., juices, vegetable extracts, vinegars, beers, wines and similar beverages. More particularly, this invention relates to the haze prevention, flavor improvement and clarification of such beverages by contacting them with water-insoluble but water-swellable polymers in a porous granular or porous bead form and subsequently regenerating these polymer beads.

Most beverages of the class contemplated, are subject to the production of haze, particularly when chilled after storage. For example, a beer which may be perfectly clear at room temperature may develop a non-biological veil when cooled in ice. This cloudy veil, commonly known as "chill haze," is thought to be due to the presence of a polymerized phenolic tannin-like complex in the beer. (McFarlane Tech. Quart. Master Brewers Assoc. of A. V5 pg. 87–92). In the case of wines, teas, vinegars and fruit juices, the presence of polymerizable polyphenolics may result in a browning of the color, alteration of flavor, as well as the formation of a haze. Accordingly, it is such polymerizable polyphenolic compounds, including flavinoids and tannins, and the oxidation products of such materials that need to be removed during the pre-clarification and cellaring steps of beverage production in order to prevent the formation of the veil, alteration of flavor, browning of color or the development of haze. Such a pre-clarification insures a clear final product. Additonally, it has been noted that some off-flavors in the beverages result from these polyphenols and/or their oxidation products.

In the past, such beverages, as for example, beer, have been chill-proofed principally by the employment of proteolytic enzymes. These enzymes have the effect of degrading the proteinpolyphenol complex which develops in the beer and similar beverages and form the aesthetically objectionable haze. Such proteolytic enzymes, however, are not completely satisfactory since upon long storage, the components formed by enzymatic digestion tend to recombine in the beverage and a haze forms. The degraded protein has also been noted to adversely effect the stability of the head of the beer. An after-taste has also been noted.

A solution to this problem is disclosed in U.S. Pat. No. 2,688,550 which relates to the employment of soluble polyvinylpyrrolidone (PVP). PVP, when added to the beverage, forms a precipitate with the tannic acid and/or tannins, which precipitate can be removed from the beverage. However, the use of PVP as disclosed in U.S. Pat. No. 2,688,550, requires a very strict control of the amount of PVP that is added in order to complex with the tannins and other materials. The PVP is water-soluble and therefore, any excess that is not utilized to form the precipitate will dissolve in the beverage that is being treated. This soluble remainder, therefore, adds an unnecessary and unwanted foreign substance to the beverage.

U.S. Pat. No. 2,947,633 teaches the clarification of beer and similar beverages by the utilization of a water-insoluble copolymer of PVP to eliminate the problem with respect to the possible dissolving of excess water-soluble PVP. This process has various limitations; for example, the water-insoluble PVP material taught in U.S. Pat. No. 2,947,633, can only be prepared as a fine powder. Accordingly, the usefulness of such fine powders, is reduced since special time-consuming settling or decantation and/or power-consuming pressure filtration or centrifugation are necessary to remove the fine powder from the beverage lest the powder form its own haze. Such fine powder copolymers are unsuited for rapid and complete filtration and for use in a packed column or similar operations.

Similarly, U.S. Pat. No. 3,117,004 discloses a process for pre-clarification by removing tannins and similar materials from vegetable beverages by the use of an insolubilized PVP. This insolubilized PVP is also only available as a fine powder, and this process is subject to the same limitations as are described above.

Therefore, it has long been a desire of the industry to provide an economical process for the clarificaton of beer, wine, juices and similar vegetable extracts and beverages, both fermented and non-fermented, which eliminates the inherent disadvantages and limitations of prior art processes.

This has been accomplished in accordance with the present invention. Thus, it has now been discovered that it is possible to effectively and efficiently "chill haze-proof" beer, prevent the browning of wine, the degradation of wine flavor and the formation of haze in fruit juices, vegetable extracts (teas), etc. by the use of a water-insoluble but water-swellable crosslinked N-vinyllactam polymer or N-alkyl-N-vinylamide polymers in the form of porous granules or beads and then, as the beads or granules become spent, regenerating them for repeated use.

Accordingly, it is a principle object of the present invention to provide an effective, economical and efficient process for the improvement and clarification of vegetable extracts, beers, wines, fruit juices, vinegars and similar extracts and beverages, which process eliminates the inherent deficiencies and disadvantages or prior art processes and provides added economic advantages.

Still further objects and advantages of the process of the present invention will become more apparent from the following more detailed description thereof.

In accordance with the present invention, the employment of granules or beads of water-insoluble but water-swellable cross-linked N-vinyllactam or N-alkyl-N-vinylamide polymers for the improvement in quality of beers, wines, vinegars, fluid extracts, decoctions, juices, and similar beverages, allows such improvement operations and processes to be conducted either in packed columns or rapid filtration or separation and purification systems wherein the property of rapid liquid-solid contacting and separation is available. Thus, the use of the porous granular or bead form of a water-insoluble but water-swellable crosslinked N-vinyllactam or N-alkyl-N-vinylamide polymer, in accordance with the present invention, is advantageously superior to prior art use of finely powdered, insoluble, vinylpyrrolidone polymers which require extremely long decantation and drainage times and/or cumbersome and power-consuming pressure filtration of the liquid from the powder.

In carrying out the process of the present invention, the beverage-containing polyphenolics and similar objectionable materials need merely to be contacted with the porous water-insoluble but water-swellable crosslinked N-vinyllactam or N-alkyl-N-vinylamide polymer granules or beads. This may be done by adding the porous granules or beads of water-insoluble but water-swellable crosslinked N-vinyllactam or N-alkyl-N-vinylamide polymer to the liquid and then separating same after the complexing action has been completed.

Preferably, however, the process of the present invention is carried out in a system wherein rapid throughput is obtained. Thus, the water-insoluble but water-swellable crosslinked N-vinyllactam or N-alkyl-N-vinylamide polymer granule or absorbing agents have sufficient strength for use in ordinary gravity or pressure filtration systems or packed columns. These systems and columns have the advantage of rapid throughput with high capacity for absorbing the phenolic and polyphenolic compounds.

The porous beads or granules of the process of this invention, because of their porosity and/or high surface area are capable of absorbing at least as much tannins and other haze-forming materials as the previously used polymers which were available only as powders. This capacity for polyphenolics may be a function of adsorption or absorption and/or subsurface, porous diffusion phenomena. For the sake of clarity, the generic term absorption shall be used and is to include adsorption and/or subsurface porous diffusion as well.

The polymer employed in accordance with the process of the present invention comprises a water-insoluble but water-swellable crosslinked N-vinyllactam or N-alkyl-N-vinylamide polymer in the form of porous beads or granules of excellent strength. Such polymeric products are prepared in accordance with the process disclosed and claimed in applications Ser. No. 736,302 filed June 12, 1968, now abandoned and U.S. Pat. application Ser. No. 131,434, filed Apr. 5, 1971, now U.S. Pat. No. 3,689,439.

The N-vinyllactams employed in the preparation of the crosslinked polymers utilized in the present process are lactams having the general formula:

may be prepared in a known manner by N-vinylation of the corresponding lactams at elevated temperatures in a manner such as disclosed in U.S. Pat. No. 2,317,084. Accordingly, representative N-vinyllactams operable in accordance with the present invention include such as: N-vinyl-2-pyrrolidone and N-vinyl-substituted derivatives of the following lactams: 3,3-dimethyl-2-pyrrolidone, 4,4-dimethyl-2-pyrrolidone, 3,4-dimethyl-2-pyrrolidone, 3-ethyl-2-pyrrolidone, 3,5-dimethyl-2-pyrrolidone, 3-phenyl-2-pyrrolidone, 4-acryl-2-pyrrolidone, 5-ethyl-2-pyrrolidone, 3-methyl-2-pyrrolidone, 4-methyl-2-pyrrolidone, 5-methyl-2-pyrrolidone, 3,3,5-trimethyl-2-pyrrolidone; 2-piperidone, 5,5-diethyl-2-piperidone, 5,6-dimethyl-2-piperidone, 4-ethyl-2-piperidone, 6-ethyl-2-piperidone, 6-ethyl-3-methyl-2-piperidone, 3-methyl-2-piperidone, 4-methyl-2-piperidone, 5-methyl-2-piperidone, 6-methyl-2-piperidone; 2-caprolactam, 3,6-dimethyl-2-caprolactam, 4,6-dimethyl-2-caprolactam, 7,7-diethyl-2-carpolactam, 3-ethyl-2-caprolactam, 5-ethyl-2-caprolactam, 6-ethyl-2-caprolactam, 7-ethyl-2-caprolactam, 4-ethyl-6-methyl-2-caprolactam, 6-ethyl-4-methyl-2-caprolactam, 3-methyl-2-caprolactam, 4-methyl-2-caprolactam, 5-methyl-2-caprolactam, 6-methyl-2-caprolactam; 2-oxazinidinone (e.g. U.S. Pat. No. 2,905,669 and U.S. Pat. No. 3,097,087), 5-ethyl-2-oxazinidinone, 5-phenyl-2-oxazinidinone, 4,5-dimethyl-2-oxazinidinone, 5,5-dimethyl-2-oxazinidinone, 2,5-diphenyl-2-oxazinidinone, 2-phenyl-4-oxothiazolidone, 2,2'-diphenyl-4-oxothiazolidone, 2,2'-dimethyl-4-oxothiazolidone; 2-oxazolidinone (deriv. in U.S. Pat. No. 2,905,690 and U.S. Pat. No. 2,891,058), 5-methyl-2-oxazolidinone, 4-methyl-2-oxazolidinone, 5-ethyl-2-oxazolidinone, 4,5-dimethyl-2-oxazolidinone, 2-phenyl-2-oxazolidinone, 5-butyl-2-oxazolidinone, 5-propyl-2-oxazolidinone, 4,5-diethyl-2-oxazolidinone; 3-morpholinone disclosed in U.S. Pat. No. 2,987,509, e.g., 5-methyl-3-morpholinone, 5-ethyl-3-morpholinone; 3,5-dimethyl-

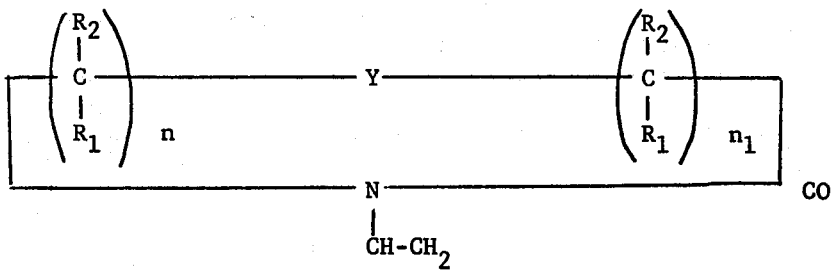

wherein $R_1$ and $R_2$ = hydrogen, alkyl and aryl $$Y = -O-, \ -S-, \ -SO_2-, \ -\underset{R_1}{\overset{R_2}{\underset{|}{N}}}- \ \text{and} \ -\underset{R_1}{\overset{R_2}{\underset{|}{C}}}-$$

$n$ and $n_1$ range from 0 to 5 but where only one of the $n$ or $n_1$ values may be zero.

Such N-vinyllactams are those which can be prepared, for example, by the vinylaction of lactams such as disclosed in U.S. Pat Nos. 2,891,058; 2,265,450; 2,335,454 and 2,097,087. Similarly, the N-vinyllactams 3-morpholinone; 2-piperazinone (e. g. JACS 62, 1202 (1940), the 3,3-dimethyl-2-ketopiperazine, 3-methyl-2-ketopiperazine; 4-thiazolidone (e. g. JACS 76, 578 (1954), 2-methyl-4-thiazolidinone 2-phenyl-4-thiazolidinone; 2-phenyl-4-thiazolidinone dioxide; 2-thiazolidone (J. Chem. Soc. 1949, 2367); 3-thiamorpholinone; 2-pyrimidone (e. g., J. Chem. Soc. 1959, 525); 2-imidazolidones (e. g., Ann. 232, 1222 (1885)); N,N-ethylene-thioureas (e. g. J. Biol. Chem. 163, 761 (1946); tetrahydro-(2H, 1, 3)-oxazin-3-ones. (e. g. U.S. Pat. No. 2,940,971), and the like.

Similarly, suitable N-alkyl-N-vinylamides useful in accordance with the present invention are those which correspond to the formula:

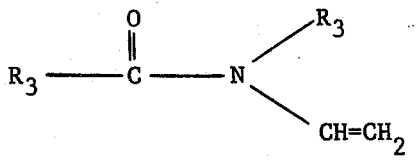

wherein $R_3$ is independently selected from the class of hydrocarbon radicals of 1 to 4 carbon atoms preferably 1 to 2 carbon atoms.

Such N-alkyl-N-vinylamides are illustrated in U.S. Pat. No. 3,214,370, exemplary amides being: N-alkyl-N-vinylamides include N-methyl-N-vinylacetamide, N-ethyl-N-vinylacetamide, N-butyl-N-vinylacetamide N-methyl-N-vinylpropionamide, N-methyl-N-vinylpentanoic acid amide, N-methyl-N-vinylformamide and the like.

In preparing the porous granular or porous bead form of polymer in accordance with the present invention, the N-vinyllactam or N-alkyl-N-vinylamide, with or without a further copolymerizable monomer and with a crosslinking agent as to be hereinafter defined, is polymerized in a manner described in applications Ser. No. 736,302 now abandoned and Ser. No. 131,434, filed Apr. 5, 1971 now U.S. Pat. No. 3,689,439. In this connection, as defined in such co-pending applications, the porous granular or bead form of the polymer is produced from a suspension polymerization system wherein the lactam or amide monomer with optional copolymerizable monomer and the crosslinking agent are polymerized in an aqueous solution of an electrolyte, the suspension being maintained during polymerization by mechanical means. In such polymerization process, a free radical polymerization catalyst source is utilized.

In this regard, the preparation of the porous bead or granular form of polymer involved the polymerization of the N-vinyllactam or N-alkyl-N-vinylamide with an amount of crosslinking agent, a polyfunctional monomer, within the range of about 2.5 to about 20% by weight based on the weight of the N-vinyllactam or N-alkyl-N-vinylamide. Smaller amounts of crosslinking agent permit the leaching of soluble PVP into the beverage and also lack dimensional stability. Because of such lack of dimensional stability, when the beads containing less than the aforesaid amount of crosslinking agent are packed into columns, they compress to form a gel-like mass which is substantially impermeable to the precolation of the liquids to be treated. Such polymerization is carried out in an aqueous solution of an electrolyte, the concentration of electrolyte being high enough to produce phase separation before or during polymerization. In this regard, a preferred electrolyte solution contains from about 10% to saturation of sodium chloride or sodium sulfate. Since the monomers polymerized in accordance with this procedure are not very soluble in such electrolyte solutions, by using more than enough monomers to saturate the solution of electrolyte, a suspension of the excess monomers can be made through mechanical agitation. In this connection, the use of an excess of undissolved electrolyte salt is often beneficial.

In the polymerization process, the relative proportion of total monomer to water is determined at the upper limit by the ability of heat removal and the danger of particle agglomeration; this upper limit being as high as about 80% monomer, preferably about 50% monomer based upon the weight of the water. The lower limit is inter alia based on convenience of operating without undue bulk; the process being capable of being carried out successfully with as low as 1% monomer, based on the weight of the water in the aqueous electrolyte system.

As indicated previously, the polymerization process is conducted in the presence of a catalyst which provides a source of free radicals. In this respect, any of the conventional free radical initiator catalysts generally employed in vinyl polymerizations can be employed. Such catalysts are added either to the monomers to be polymerized or to the aqueous solution of electrolyte. The catalyst can comprise any of the conventional peroxide catalysts, e.g., benzoyl peroxide, di-t-butyl peroxide, as well as the azo catalysts, e.g., azo-bisisobutyronitrile.

The cross-linking agents which are suitably employed in the preparation of the porous bead or granular form of polymer for the present invention are those which contain two or more functional groups capable of taking part in the polymerization reaction in order to provide a polymeric product having a crosslinked or three dimensional structure.

Suitable crosslinking agents that have been found applicable in accordance with the present invention are the alkylenebisacrylamides, e.g., N,N'-methylenebisacrylamide, the alkylene glycol dimethacrylates, e.g., ethylene glycol dimethacrylate, diethylene glycol dimethacrylate, tetraethylene glycol dimethacrylate, higher polyethylene glycol dimethacrylate, 1,3- and 1,4-butanediol diacrylates and dimethacrylates, etc. and the divinyl aromatic compounds, e.g., divinyl benzene, divinylethylbenzene, divinylchlorobenzene, divinyltoluene, divinyl naphthalene, etc. Other suitable crosslinking agents include allyl acrylate, p-isopropenylstyrene, trivinyl meseate, diallyl maleate, divinyl ether, 1,3- and 1,4 divinyl oxybutane, trivinyl citrate, divinyl o-phenylene diacetate, vinyl allyl ether, diethylene glycol diallyl ether, trivinyl glyceryl ether, divinyl glyceryl ether, tetravinyl pentaerythrityl ether, hexahydro-1,3,5-triacryl-s-triazine, vinylpyrrolidone dimers described in U.S. Pat. No. 3,252,995 and the like. Divinylbenzene and the vinylpyrrolidone dimers are the preferred cross-linking agents. Of course, mixtures of the above-cited suitable crosslinking agents can be advantageously employed where desired.

As indicated above, the crosslinking agent is generally employed in an amount of from 2.5 to about 20% by weight based upon the weight of the N-vinyllactam or N-alkyl-N-vinylamide monomer. An amount of from about 3% to about 15% of the cross-linking agent is preferred as such resultant granules are physically strong, contain a minimum of soluble monomer residue and are capable of at least 5 and up to 50 regeneration cycles.

Similarly, as indicated above, the N-vinyllactam or N-alkyl-N-vinylamide can be polymerized in the presence of an optional copolymerizable monomer. Preferably such copolymerizable monomer should be present in an amount of less than about 50% by weight based on the weight of the N-vinyllactam or N-alkyl-N-vinylamide monomer, and more preferably, in an amount of less than about 20% by weight.

Examples of comonomers which can be employed are the N-vinyllactams or N-alkyl-N-vinylamides listed above, or acrylates, e.g., methyl, ethyl, propyl and higher alkyl, phenyl, naphthyl and other aryls; α-substituted acrylates such as α-methyl, ethyl, propyl and higher alkyl, phenyl, naphthyl and other aryls; vinyl ethers, e.g., methyl, ethyl, propyl and higher alkyls, acrylamide, acrylic acid, acrylonitrile, allyl acetate, allyl alcohol, crotonic acid, dimethylaminoethylvinyl sulfide, diethylhexyl maleate, didodecyl maleate, fumaramide, itaconic acid, methacrylic acid, methacrylamide, methoxy styrene, methyl vinyl ketone, methyl vinylpyrrolidone, 2-methyl-5-vinyl-pyridine, styrene, trichloroethylene, vinyl carbazole, vinylimidazole, vinyl laurate, vinyl methyl benzimidazole, vinyl methyl dichloro silane, vinyl methyl oxazolidinone, vinyl oxyethylurea, vinyl propionate, vinyl pyridine, vinyl siloxanes, vinyl stearate, vinyl acetate (and the derived vinyl alcohol).

It is noted that a further description of the production of the crosslinked particulate polymeric N-vinyllactam polymers and copolymers and N-alkyl-N-vinylamide polymers and copolymers in the form of porous beads or granules can be found in co-pending application Ser. No. 736,302, filed June 12, 1968, and now abandoned, and Ser. No. 131,434, filed Apr. 5, 1971, now U.S. Pat. No. 3,689,439. Thus, for example, the polymerization process may be carried out by adding all of the monomers to the salt solution in one charge or such monomers may be added in portions or continuously during the polymerization. The polymerization is usually carried out at about 20° to 80°C. and requires a relatively short time for completion, e.g., about two to six hours. Accordingly, the disclosure of co-pending application Ser. No. 131,434, filed Apr. 5, 1971, now U.S. Pat. No. 3,689,439 as it pertains to the production of the water-soluble but water-swellable crosslinked polymers employed in the process of the present invention is herein incorporated by reference. The crosslinking agent or agents need only be those containing at least two functional groups capable of reacting in the polymerization reaction so as to form a crosslinked or three dimensional network in the polyvinylpyrrolidone product, the preferred N-vinyllactam.

As stated above, the polymerization of the vinylpyrrolidone, with or without additional copolymerizable monomers, in the presence of a crosslinking agent is conducted in an aqueous solution of an electrolyte. Such electrolyte is employed in a concentration sufficiently high as to produce phase separation before or during polymerization. A preferred aqueous electrolyte mixture contains from 5 to 80%, preferably 10% to saturation of the suitable electrolyte salts. For example, sodium sulfate solutions saturated at the reaction temperature are particularly useful. Generally, alkali metal and ammonium salts such as sodium, lithium and potassium sulfate; sodium, potassium and lithium chloride; sodium, potassium, lithium and ammonium acetate, etc., are employed as the electrolyte. It is often beneficial to include a buffer such as disodium hydrogen phosphate in order to maintain the reaction mixture at neutral to slightly alkaline pH.

As the monomers are not very soluble in such electrolyte solutions, more than enough of the vinylpyrrolidone monomer to saturate the aqueous solution of electrolyte is employed and a suspension of the excess monomer and the insoluble polymer that is formed can be maintained through mechanical agitation.

The clarification process of the present invention is generally carried out by the use of the porous granules or beads of water-insoluble but water-swellable crosslinked N-vinyllactam or N-alkyl-N-vinylamide polymer in packed columns or filtration purification systems wherein the property of rapid throughput is desired. When employed in such systems, undried beads ranging in size of approximately 1–7 mm. in diameter are generally employed. Of course, such size is only exemplary and particles having diameters greater or smaller can be employed where desired.

A further aspect of the instant invention is that the crosslinked polymer after absorbing the polyphenolics and/or other haze and taste components may be readily regenerated by contacting same with an aqueous alkaline medium. Such a regeneration has surprisingly been found not to effect the activity of the polymer even on repeated cycling. Furthermore, the polymer beads have been found not to degrade as a result of such repeated cycling. Consequently, the process of the invention has the added advantage of a lower economic cost due to the continued reuse of the cross-linked polymer beads.

In column type extraction, after contacting 100 barrels of beer per pound of beads (dry weight) the polymer beads of this invention approach their limit of absorption. Due to the heterogenous nature of natural polyphenols, the exact saturation weight of extractives per pound of polymer is difficult to ascertain but when such a quantity of throughput of product is approached, the bead column is ready for regeneration. In commercial practice, it is preferred to regenerate the beads at about one-fourth of saturation levels. In good commercial practice, it is most expedient to regenerate the columns after 50 to 100 barrels of product per pound of beads has passed through the column and been clarified but preferably after 65 to 85 barrels of beer, wine, vinegar or juice per pound of resin have been treated. In the treatment of other beverages, the throughput of the beverage prior to regeneration will vary with the nature of the beverage.

Columns of the beads of this invention require regeneration after the passage of the following quantities of liquid vegetable extracts per pound of beads (dry weight).

|  | Gallons |
| --- | --- |
| Beer | 100 |
| Wine (white) | 100 |
| Wine (sherry) | 80 |
| Vinegar (cider) | 125 |
| Vinegar (wine) | 80 |
| Cider | 90 |
| Brandy (cask aged) | 100 |
| Citrus juices (before reconstitution) | 150 |
| Tea (concentrated) | 70 |
| Depulped prune juice | 60 |
| Senna Decoction | 60 |
| Decocainized cocoa leaf extract | 90 |
| Coffee concentrates | 75 |

The various fluid extracts mentioned above, after passage through the column, are freed of chill-haze tendencies. In addition, burnt, bitter and off flavors are removed to such an extent that certain poor and young sherries are upgraded by degree; judged equivalent to three years of normal aging. Prune and senna extracts, while still laxative after treatment, appear to be freed of harsh purging ingredients. Citrus juices, ciders and apple juices are freed of bitter and sharp principles such as naringins and naringenins and related or similar anthrocyanigenins. Coffee, tea and cocoa leaf extracts, after passage through the column are adjudged improved in flavor and bouquet. Wines, brandy and vinegars have been noted to possess improved shelf life with minimal residues after months of exposure to light in colorless bottles at elevated temperatures.

When regenerating the beads, the exact concentration of alkali in the regeneration solution is not critical.

Concentrations ranging upwards from 0.01 N NaOH or KOH have proven satisfactory for removing the absorbed polyphenols from the porous polymer. It is preferred, however, to use 0.1 N to 0.5 N alkali for this purpose inasmuch as in such concentrations, the time necessary for removing the polyphenols from the resin is minimal. In practice, almost complete elution of the polyphenols from the resins is accomplished in a few minutes when 0.1 N sodium hydroxide was used on resin beads which had been completely saturated with the polyphenolic absorbates. The 0.1 N alkali concentration is readily washed from the resin by the throughput through the resin column of 10 resin bed volumes of water. It is preferred, however, to put these volumes of water through the resin at a lower rate than that at which the alkali was applied. Due to the high surfactant qualities of the alkali, it readily diffuses from the resin into the wash water. After 10 resin bed volumes of water, the pH of the effluent wash water should indicate the completion of the wash cycle. After the washing of the regenerated resin, the flow of product through the column may then be resumed. It is, of course, necessary to discard the initial effluent since it is a water-product mixture.

In industrial practice, it has been found that the regenerative process aspects of this invention may be repeated through at least 20 cycles before there appears to be any loss of the absorptive capacity of the resin beads.

After 30 to 50 cycles, it is advantageous to subject the beads to a prolonged soaking with more concentrated alkali solutions (0.5N) in order that the more insoluble extractives can be effectively removed from the resin. Such a treatment renews almost completely the absorptive capacity of the porous beads. By following such a course of treatment, approximately 100 regenerative cycles are possible. After 100 such cycles, a spalling of the resin beads has been noted. Since spalling presennts added filtration problems, in the absence of adding such filtration equipment to the product clarification train, it is preferred to discard such multi-cycled resins and start with a fresh supply.

One may employ sodium hydroxide solution to recycle the crosslinked polymer as well as other alkaline media. That is to say, that either inorganic or organic alkaline media may serve to remove the adsorbed material from the polymer. When, however, tannins are extracted from a beverage, aqueous inorganic alkaline materials such as sodium hydroxide are preferred. The amount of alkalinity is not critical to the instant process and any amount which desorbs the adsorbed material may be employed.

The recycling of the crosslinked polymer may be readily and simply effected by passing the alkaline media through the column or cartridge of polymer in a manner similar to that employed in connection with the purification of the beverages.

The process of the present invention will now be described by reference to the following specific examples illustrating the preparation of the beads, their use and regeneration after use. It is to be understood, however, that such examples are presented for purposes of illustration only, and the present invention is in no way to be deemed as limited thereto.

EXAMPLE 1

Into a 500 ml. resin flask equipped with thermometer, stirrer, gas inlet, dropping funnel, and condenser connected to gas outlet were charged:

| | | |
|---|---|---|
| 40.0 g. | g. | (0.36 mole) distilled vinylpyrrolidone |
| 0.12 | g. | azobisisobutyronitrile |
| 240.0 | g. | distilled water |
| 1.6 | g. | (0.010 mole) methylenebisacrylamide |
| 0.46 | g. | 10% by weight Na$_2$HPO$_4$ solution |
| 40.0 | g. | anhydrous sodium sulfate |

Air was removed by closing the gas inlet and applying enough vacuum at the gas outlet to cause violent ebullition for 30 seconds. The vacuum was then released by allowing nitrogen to enter the gas inlet. This procedure was repeated two more times and then a positive pressure of nitrogen maintained by connecting the gas outlet to a mineral oil blow-out leg having a depth of one inch of oil. The flask was heated with stirring in a constant temperature bath for 4 hours at a reaction temperature of 50° to 65°C. At the end of this time a solution of

| | | |
|---|---|---|
| 0.04 | g. | azobisisobutyronitrile |
| 0.4 | g. | methylenebisacrylamide |
| 10.0 | g. | C. P. ethanol |
| 10.0 | g. | distilled water | was charged to the dropping funnel and the air removed by violent ebullition and replaced with nitrogen. This procedure was repeated two more times by suitable adapters connected to the dropping funnel.

The above solution was then added to the contents of the flask and the heating continued for 2 additional hours at 62° to 63°C. At the end of this time the beads produced were filtered and washed with one gallon of distilled water and then dried in a vacuum oven at 40°C.

The dried white beads weighing 41.5 grams (98.8% yield), were substantially ash-free, whiteness being due to the light scattering caused by the pores within the beads. The porosity was confirmed by microscope examination.

EXAMPLE 2

Following the procedure of Example 1,

| | | |
|---|---|---|
| 40.0 | g. | (0.36 mole) distilled vinylpyrrolidone |
| 0.4 | g. | azobisisobutyronitrile |
| 200.0 | g. | distilled water |
| 1.2 | g. | ethylene glycol dimethacrylate |
| 0.5 | g. | 10% by weight Na$_2$HPO$_4$ solution |
| 33.0 | g. | anhydrous sodium sulfate | were charged to the resin flask and heated with stirring at a reaction temperature of 50° to 69°C for a total of 5 ½ hours.

The beads were filtered and washed with 1 gallon distilled water and dried in a vacuum oven at 45° to 50°C.

The dried white beads weighed 39.0 grams (94.6% yield).

EXAMPLE 3

Following the procedure of Example 1,

| | | |
|---|---|---|
| 40.0 | g. | (0.36 mole) distilled vinylpyrrolidone |
| 0.12 | g. | azobisisobutyronitrile |
| 240.0 | g. | distilled water |
| 2.0 | g. | tetraethylene glycol dimethacrylate |
| 1.0 | g. | 10% by weight Na$_2$HPO$_4$ solution |
| 40.0 | g. | anhydrous sodium sulfate | were charged to the resin flask and heated with stirring at a reaction temperature of 50° to 67°C for a total of 5 hours. The washed and dried beads weighed 39.2 g. (93.3% yield).

EXAMPLE 4

Following the procedure of Example 1,

| | | |
|---|---|---|
| 40.0 | g. | distilled vinylpyrrolidone |
| 0.12 | g. | azobisisobutyronitrile |
| 240.0 | g. | distilled water |
| 6.0 | g. | polyethylene glycol dimethacrylate |
| 2.0 | g. | 10% by weight solution $Na_2HPO_4$ |
| 40.0 | g. | anhydrous sodium sulfate | were charged to the resin flask and heated with stirring at a reaction temperature of 50° to 67°C for a period of 3 ¾ hours. At the end of which time a solution of

| | | |
|---|---|---|
| 0.04 | g. | azobisisobutyronitrile |
| 0.4 | g. | methylenebisacrylamide |
| 10.0 | g. | C.P. ethanol |
| 10.0 | g. | distilled water | was added from the dropping funnel as in Example 1, and the heating continued for an additional 1 ½ hours at 60°C.

EXAMPLE 5

Following the procedure of Example 1,

| | | |
|---|---|---|
| 40.0 | g. | distilled vinylpyrrolidone |
| 0.16 | g. | azobisisobutyronitrile |
| 132.0 | g. | distilled water |
| 1.6 | g. | p-divinylbenzene (99% purity of Shell Oil Co.) |
| 0.14 | g. | 10% by weight $Na_2HPO_4$ |
| 35.0 | g. | anhydrous sodium sulfate | were charged to the resin flask and heated with stirring at a reaction temperature of 50° to 84°C for a period of 4.0 hours.

50 ml. methanol were added and stirred for ½ hour at 75°C. then filtered and washed as before. The dried beads weighed 41.6 g. (100% yield).

EXAMPLE 6

The following reactants were charged into a 1 liter stainless steel autoclave equipped with a 4 blade turbine type stirrer:

| | | |
|---|---|---|
| 96.0 | g. | vinylpyrrolidone |
| 8.0 | g. | divinylbenzene Dow DVB-55 (a mixture of isomers of divinylbenzene, ethyl vinylbenzene, and diethylbenzene, the total divinylbenzene content being 55.0%) |
| 520.0 | g. | distilled water |
| 2.8 | g. | 10% by weight $Na_2HPO_4$ solution |
| 0.64 | g. | azobisisobutyronitrile |
| 140.0 | g. | anhydrous sodium sulfate |
| 64.0 | g. | acrylamide |

The autoclave was evacuated to 25 mm and the vacuum released with nitrogen. This procedure was repeated two more times. The contents of the autoclave were then heated with stirring to 90°C and held at that temperature for 3 hours. The beads were discharged, washed free of sodium sulfate and dried. The product yield was 151 g. (or 90% yield).

EXAMPLE 7

The following reactants were charged with a 1 liter stainless steel autoclave and treated in a manner similar to Example 6.

| | | |
|---|---|---|
| 118.8 | g. | vinylpyrrolidone |
| 1.2 | g. | acrylamide |
| 390.0 | g. | distilled water |
| 0.5 | g. | azobisisobutyronitrile |
| 6.0 | g. | Dow DVB-55 divinylbenzene |
| 105.0 | g. | anhydrous sodium sulfate |
| 0.4 | g. | 10% by weight $Na_2HPO_4$ solution |

The copolymer was produced in a yield of 94.7%.

EXAMPLE 8

In order to illustrate the process of the present invention and the effective extraction absorption or complexing of the polyphenols and similar materials found in beer, experiment was conducted employing the following continuous extraction apparatus. The apparatus employed comprises a 48 inch glass column having an inside diameter of 1 inch including, above the stopcock, a glass wool plug, perforated porcelain disc and glass holddown collar. A separatory funnel, equipped with a capillary tube, was in position at the top of the glass column so as to supply the beer through the column by gravity feed.

The porous beads, ranging in size from approximately 1 to 7 millimeters in diameter, were composed of vinylpyrrolidone polymer crosslinked with divinylbenzene (from Example 5) and were in the water-swollen state (20.6% solids) obtained by eliminating a final step in their preparation.

The beer to be treated was ruh stage beer which had received no previous chill-haze proofing treatment.

With the glass wool, perforated disc, the holddown collar in place the tube was filled with distilled water. 193 grams of the swollen beads then were introduced into the tube. This amount was sufficient to provide a column of beads 24 inches long by 1 inch in diameter occupying a tube volume of 308.7 cubic centimeters. The column of beads was stratified according to size by passing distilled water upward through the column and out the top of the tube.

After washing and stratifying the beads, the level of water in the tube was dropped to a point 1 inch above the column of beads. The separatory funnel equipped with capillary tube was filled with beer and the entire assemblage attached to the top of the extraction tube. The extraction process was started by opening both the upper and lower stopcocks (flow rate is controlled through the lower stopcock alone). As beer entered the tube, it gradually displaced the water already present in the column of beads, forcing the water out the bottom of the tube. At all times the level of liquid in the tube was maintained 1 inch higher than the bead column.

A total of 2,484 milliliters of beer was passed through the column by gravity feed over a period of 77 minutes (flow rate=32.26 ml./min.). Discarding the first 700 milliliters of effluent to assure complete displacement of the water in the column by beer, four samples of 320–330 grams each were collected. These samples immediately were packaged in 12 fluid ounce petite style amber bottles, tightly capped, and numbered consecutively in order of their collection. After each large specimen, a 20 milliliter sample also was withdrawn, sealed in a glass vial, and numbered to correspond with the preceding bottled sample.

The bottled samples, together with two similarly packaged specimens of the beer which had not undergone treatment, were subjected to a forcing test consisting of three cycles of the following: 5 days at 100° ±2°F. then 2 days at 26° ±1°F.

Upon completion of each cycle the turbidity of each sample was determined at 26°F using a CBL (Canadian Breweries Ltd.) hazeometer calibrated to read turbidity in terms of ppm. silicon dioxide required to produce the same degree of haze in standard aqueous dispersions. The ppm. silicon dioxide in CBL units can be converted to the more widely employed Formazin Turbidity Units (American Society of Brewing Chemists) by multiplying by a factor of 6.9.

The 20 milliliter samples of treated beer were analyzed for anthocyanogen content by the method of McFarlene, J. Just Brewing 67, 502–506 (1961).

Both the haze readings and the analytical results are given in Table I.

TABLE I

| Sample No. | Forcing Test Haze Readings (26°F) | | | | | | % Anthocyanogen Removed |
|---|---|---|---|---|---|---|---|
| | Cycle 1 | | Cycle 2 | | Cycle 3 | | |
| | CBL Units | Formazin Units | CBL Units | Formazin Units | CBL Units | Formazin Units | |
| 1 | 1.2 | 8.28 | 1.8 | 12.42 | 1.8 | 12.42 | 94.4 |
| 2 | 1.8 | 12.42 | 3.9 | 26.91 | 3.9 | 26.91 | 91.2 |
| 3 | 3.5 | 24.15 | 5.1 | 35.19 | 6.5 | 44.85 | 91.2 |
| 4 | 2.8 | 19.32 | 5.2 | 35.88 | 8.5 | 58.65 | 92.0 |
| Control 1 | >40 | >276 | >40 | >276 | >40 | >276 | — |
| Control 2 | >' | >276 | >40 | >276 | >40 | >276 | — |

It can be seen that turbidity of the beer has been reduced from a value greater than 40 (upper limit of the hazeometer) to values as low as 1.2. Testing for anthocyanogen shows that from 91.2 to 94.4% of that originally present in the beer is removed by the treatment.

EXAMPLE 9

Example 8 was repeated using a fresh sample of beer, a fresh column of beads, and a flow rate of 17.49 ml./min., about half the rate employed in the first example. With the exception of this change in flow rate and the collection of five samples rather than four, Example 9 was an exact duplicate of Example 8, not only in column preparation, extraction procedure, sampling technique, and testing, but even in the amount of crosslinked polyvinylpyrrolidone beads used to form the column and the volume of beer treated. Test results are given in Table 2. In general, results are similar to those reported for Example 8.

TABLE 2

| Sample No. | Forcing Test Haze Readings (26°F.) | | | | | | % Anthocyanogen Removed |
|---|---|---|---|---|---|---|---|
| | Cycle 1 | | Cycle 2 | | Cycle 3 | | |
| | CBL Units | Formazin Units | CBL Units | Formazin Units | CBL Units | Formazin Units | |
| 1 | 091.75 | 12.08 | 2.0 | 13.8 | 1.8 | 12.42 | 97.6 |
| 2 | 0.6 | 4.14 | 0.7 | 4.83 | 3.0 | 20.70 | 97.6 |
| 3 | 2.1 | 14.49 | 2.4 | 16.56 | 4.4 | 30.36 | 97.6 |
| 4 | 1.2 | 8.28 | 2.0 | 13.8 | 5.9 | 40.71 | 98.4 |
| 5 | 2.0 | 13.8 | 5.0 | 34.5 | 7.0 | 48.30 | 91.2 |
| Control 1 | >40 | >276 | >40 | >276 | >40 | >276 | — |

TABLE 2-Continued

| Sample No. | Forcing Test Haze Readings (26°F.) | | | | | | % Anthocyanogen Removed |
|---|---|---|---|---|---|---|---|
| | Cycle 1 | | Cycle 2 | | Cycle 3 | | |
| | CBL Units | Formazin Units | CBL Units | Formazin Units | CBL Units | Formazin Units | |
| Control 2 | >40 | >276 | >40 | >276 | >40 | >276 | — |

EXAMPLE 10

As described in Example 8, a column containing 193 grams of the water-swollen beads was prepared.

The wine to be treated was a white, dry type, in the fully fermented, but not yet modified or filtered stage. The wine was passed through a 3 Whatman filter paper prior to usage but remained in a very cloudy state.

Approximately one gallon of the cloudy wine was passed through the prepared column by gravity feed over a 35 minute period. Discarding the first 700 ml. of effluent, five 7–8 fluid ounce samples and one 3–4 fluid ounce sample were collected consecutively and packaged in 8 oz. and 4 oz. clear glass bottles, respectively. The colors of the six treated samples and of an untreated control were determined using a Hellige Varnish Comparator. The samplers then were placed in an air-circulating oven adjusted to 50°C. and their colors again determined after 4, 7 and 14 day intervals. The less the change in color, the more effective the crosslinked porous beads in removing those substances causing discoloration of white wines on aging. Results are shown in Table 3.

TABLE 3

| Sample No. | Hellige Color X Days at 50°C. | | | |
|---|---|---|---|---|
| | 0 | 4 | 7 | 14 |
| Control | 3–4 | 4— | 5+ | 6–7 |
| 1 | 3— | 3+ | 4— | 6— |
| 2 | 2–3 | 3— | 4 | 6 |
| 3 | 2–3 | 3— | 4 | 6 |
| 4 | 2–3 | 3— | 4 | 6 |
| 5 | 2–3 | 3— | 4 | 6 |
| 6 | 2–3 | 3— | 5 | 6+ |

EXAMPLE 11

Example 10 was repeated using a fresh column of beads, a passage of time of 25 minutes, and a fresh sample of wine which had been filtered through a Hyflo Super Cel and Dicalite 115 bed to give a clean, clear filtrate. With these exceptions, Example 11 was a duplicate of Example 10. Results are shown in Table 4.

TABLE 4

| Sample No. | Hellige Color X Days at 50°C. | | |
|---|---|---|---|
| | 0 | 7 | 14 |
| Control | 1–2 | 4— | 5–6 |
| 1 | 1–2 | 2+ | 3+ |
| 2 | 1–2 | 2+ | 3–4 |
| 3 | 1–2 | 2+ | 3–4 |
| 4 | 1–2 | 2+ | 3–4 |
| 5 | 1–2 | 2+ | 3–4 |
| 6 | 1–2 | 3+ | 4–5 |

EXAMPLE 12

Red and white cellar wines obtained from a commercial source were rough filtered through a Sparkler filter to remove insoluble materials. One-gallon samples of the wine were treated in glass bottles according to times and conditions indicated in Table 5. After treatment, the wine was polish filtered through the Ertel filter under $CO_2$ counter pressure into glass storage bottles and then held for two weeks at 25°F. Color measurements were taken on both red and white wines prior to storage and after two weeks storage at 25°F. After storage, the wine was filtered, bottled, pasteurized and tasted. The bottles were placed in storage at 60°C. for ten days in order to assess the development of haze.

The optical density of red wine at 420 m$\mu$ and 520 m$\mu$ before and after storage at 250°F. and also after storage for ten days at 60°C. is shown in Table 6. In order to obtain readable optical densities, the red wine was diluted 1 to 10 with distilled water. Results indicate that initially very little change in optical density, therefore, very little haze is found as a result of treatment of the wine with Polyclar AT (PVP powder insolubilized as taught in U.S. Pat. No. 3,117,004) or AT717 (beads prepared according to Example 5 supra [wet state approximately 20% solids]). The unfiltered wine, however, shows a greater optical density, and it was observed that color was removed upon polish filtration. After the cellaring at 25°F. an increase in optical density is seen, due to the formation of insoluble hazes containing perhaps tartrates which are irreversibly precipitated at low temperatures. Further heat treatment does not increase the haze development as measured by an increase in the optical density.

Table 7 shows similar data for the white wine. In this experiment, optical densities were also measured at 420 and 520 m$\mu$. A slight increase in optical density is seen after cellar storage for two weeks. The wine samples were stored for ten days at 60°C., and an increase in optical density (O.D.) was seen. As was the case for the red wine, no significant effect of treatment on optical density has been observed.

Table 8 shows an optical density measurement taken at 385 m$\mu$ before cellar storage and after 10 days at 60°C. This wavelength was selected because the white wine exhibited a greater optical density here than at 420 and 520 m$\mu$. As a result of the heating, a general increase in optical density was observed which was not affected by treatment. This increase was apparently the result of a color change or darkening, rather than an increase in turbidity.

Taste comments on the red and white wines are shown in Table 9 and 10, respectively. These taste measurements were made after the two-week cellar storage at 25°F. The wine as obtained was unfinished and initially the red wine had a rather astringent taste which was markedly improved by the treatment with the beads. The wines were less astringent after treatment. The treated wines were less bitter and the treatment, according to the taste panel, imparted a pleasantly blended and aged taste, characteristic to the wine.

TABLE 5

EXPERIMENTAL DESIGN FOR TREATMENT OF RED AND WHITE WINE WITH POLYCLAR AT AND AT 717

| Sample No. | Treatment | Additives, lbs./1000 gals. | | | | Contact Time, Minutes | | Storage Condition 2 weeks at 25°F. |
|---|---|---|---|---|---|---|---|---|
| | | Polyclar AT 6.0 lbs. | Ex. 5 24.0 lbs. | Ex. 5 48.0 lbs. | "O" | Minimum Time As Determined By Equipment Limitation | 60 | |
| 1 | Control | — | — | — | x | — | — | x |
| 2 | Internal Control at Minimum Contact Time | — | — | — | — | x | — | x |
| 3 | Internal Control at 60 Minute Contact Time | — | — | — | — | — | x | x |
| 4 | Polyclar AT at Minimum Contact Time | x | — | — | — | x | — | x |
| 5 | Polyclar AT at 60 Minute Contact Time | x | — | — | — | — | x | x |
| 6 | Example 5 Beads at Minimum Contact Time | — | x | — | — | x | — | x |
| 7 | Example 5 Beads (24 lbs.) at 60 minute Contact Time | — | x | — | — | — | x | x |
| 8 | Example 5 Beads (48 lbs.) at Minimum Contact Time | — | — | x | — | x | — | x |
| 9 | Example 5 Beads (48 lbs.) at 60 minute Contact Time | — | — | x | — | — | x | x |

TABLE 6

EFFECT OF STORAGE CONDITIONS ON OPTICAL DENSITY OF RED WINE+

| Sample No. | Storage Condition* | | | Storage Condition* | | |
|---|---|---|---|---|---|---|
| | 1 | 2 | 3 | 1 | 2 | 3 |
| | O.D. at 420 m$\mu$ | | | O.D. at 520 m$\mu$ | | |
| 1 | 0.195 | 0.251 | 0.251 | 0.313 | 0.341 | 0.296 |
| 2 | 0.193 | 0.246 | 0.240 | 0.313 | 0.344 | 0.280 |
| 3 | 0.197 | 0.229 | 0.254 | 0.312 | 0.321 | 0.300 |
| 4 | 0.180 | 0.231 | 0.225 | 0.286 | 0.299 | 0.272 |
| 5 | 0.181 | 0.205 | 0.236 | 0.300 | 0.283 | 0.285 |
| 6 | 0.191 | 0.245 | 0.249 | 0.308 | 0.337 | 0.300 |
| 7 | 0.198 | 0.231 | 0.249 | 0.317 | 0.327 | 0.285 |
| 8 | 0.186 | 0.239 | 0.254 | 0.310 | 0.324 | 0.304 |
| 9 | 0.187 | 0.239 | 0.249 | 0.304 | 0.335 | 0.290 |
| Unfiltered Wine | 0.221 | — | — | 0.325 | — | — |

*Storage Conditions:
1 - after treatment and filtration
2 - after 4 weeks at 25°F.
3 - after 10 days at 60°C.
+Red wine diluted 1 to 10 with distilled water

TABLE 7

OPTICAL DENSITY OF WHITE WINE AFTER STORAGE

| Sample No. | Storage Condition* O.D. at 420 m$\mu$ | | | | Storage Condition* O.D. at 520 m$\mu$ | | | |
|---|---|---|---|---|---|---|---|---|
| | 1 | 2 | 3 | 4 | 1 | 2 | 3 | 4 |
| 1 | 0.093 | 0.105 | 0.105 | 0.168 | 0.037 | 0.055 | 0.045 | 0.054 |
| 2 | 0.112 | 0.102 | 0.124 | 0.171 | 0.055 | 0.030 | 0.050 | 0.052 |
| 3 | 0.095 | 0.098 | 0.088 | 0.160 | 0.045 | 0.030 | 0.053 | 0.045 |
| 4 | 0.096 | 0.140 | 0.093 | 0.157 | 0.051 | 0.038 | 0.042 | 0.047 |
| 5 | 0.085 | 0.087 | 0.074 | 0.143 | 0.027 | 0.039 | 0.041 | 0.045 |
| 6 | 0.089 | 0.163 | 0.114 | 0.173 | 0.034 | 0.063 | 0.035 | 0.055 |
| 7 | 0.094 | 0.105 | 0.091 | 0.165 | 0.032 | 0.056 | 0.036 | 0.048 |
| 8 | 0.088 | 0.130 | 0.091 | 0.177 | 0.030 | 0.036 | 0.035 | 0.056 |
| 9 | 0.087 | 0.094 | 0.091 | 0.160 | 0.028 | 0.060 | 0.033 | 0.050 |
| Unfiltered Wine | 0.090 | — | — | — | 0.036 | — | — | — |

*Storage Conditions:
1 - after treatment and filtration
2 - after 4 weeks at 25°F. and before filtration
3 - after 4 weeks at 25°F. and after filtration
4 - after 10 days at 60°C.

TABLE 8

EFFECT OF HIGH TEMPERATURE STORAGE ON WHITE WINE

| Sample No. | O.D. After Treatment | Optical Density at 385 m$\mu$ O.D. after 10 days at 60°C. | $\Delta$ O.D. | Haze Observation |
|---|---|---|---|---|
| 1 | 0.222 | 0.332 | 0.110 | Clear |
| 2 | 0.221 | 0.340 | 0.119 | " |
| 3 | 0.224 | 0.334 | 0.110 | " |
| 4 | 0.208 | 0.315 | 0.107 | " |
| 5 | 0.206 | 0.295 | 0.089 | " |
| 6 | 0.216 | 0.344 | 0.128 | " |
| 7 | 0.225 | 0.330 | 0.105 | " |
| 8 | 0.210 | 0.348 | 0.138 | " |
| 9 | 0.207 | 0.325 | 0.118 | " |

TABLE 9

TASTE COMMENTS BY PANEL ON RED WINE

| Sample No. | AROMA | TASTE |
|---|---|---|
| 1 | sl. musty, alcoholic, estery | Dry, sl. sour, musty, astringent |
| 2 | Clean, less intense, estery | Dry, thin, sl. musty, sour, astringent |
| 3 | Fuller, estery, alcoholic | Dry, sl. musty, estery, full, v. sl. astringent |
| 4 | Estery, full | Estery, moderately, dry, acidic, v. sl. astringent |
| 5 | Light, sl. musty, grape aroma | Light body, estery, astringent |
| 6 | Estery, alcoholic, sl. musty | Sl. estery, dry immature flavor |
| 7 | Light, estery, sl. sour | Sl. estery, v. sl. sour, harsh |
| 8 | Sl. musty, alcoholic, sl. sour, less intense | Dry, sl. estery, sl. harsh |
| 9 | Sl. musty, estery, less intense | Dry, sl. estery, sl. harsh |
| 10* | Musty | Dry, musty, sour, astringent |

*Unfiltered and untreated wine

TABLE 10

TASTE COMMENTS BY PANEL ON WHITE WINE

| Sample No. | AROMA | TASTE |
|---|---|---|
| 1 | Pleasant, alcoholic, estery, aldehyde | Sour |
| 2 | Estery, pleasant, alcoholic | Sour, somewhat smoother |
| 3 | Estery, alcoholic, pleasant | Sour, sl. harsh, sl. papery |
| 4 | Estery, musty | Sharper, harsh aftertaste, fuller body |
| 5 | Weaker aroma, estery | Sl. papery, smooth, full, sweeter |
| 6 | Little aroma, alcoholic, dry | Sweeter, estery, sl. sour |
| 7 | Good aroma, but decreased decreased intensity | Smoother, balanced taste, estery |
| 8 | Sl. musty, decreased aroma, estery, sulfidic | Sweet, sl. sulfidic |
| 9 | Estery, sl. decreased aroma | Sl. sulfidic, balanced, smooth |

EXAMPLE 13

The absorptive capacity of the beads during cycling was tested as follows: Moist beads, 15.0 grams (3.45 gms. 100% dry basis) prepared in accordance with Example 5 were added to 150.0ml. of 0.1013 N salicyclic acid solution and stirred for 30 minutes. A 50 ml. aliquot was titrated with 0.1574 N NaOH and it was determined that 4.949 meq of acid were absorbed.

The beads were then filtered off and slurried with 150 ml. 0.1 N NaOH for 30 minutes then filtered and washed until neutral. The above procedure was repeated with 0.1013 N salicyclic acid and the NaOH treatment was repeated between recycles for a total of 10 cycles.

The meq of acid used at each cycle was found by titration to be as follows:

| Cycle | | |
|---|---|---|
| 1. | 4.949 | meq. acid complexed by beads |
| 2. | 5.043 | meq. acid complexed by beads |
| 3. | 4.949 | meq. acid complexed by beads |

—Continued

| Cycle | | |
|---|---|---|
| 4. | 4.576 | meq. acid complexed by beads* |
| 5. | 4.576 | meq. acid complexed by beads |
| 6. | 4.576 | meq. acid complexed by beads |
| 7. | 4.576 | meq. acid complexed by beads |
| 8. | 4.576 | meq. acid complexed by beads |
| 9. | 4.576 | meq. acid complexed by beads |
| 10. | 4.576 | meq. acid complexed by beads |
| 30. | 4.383 | meq. acid complexed by beads |
| 50. | 4.421 | meq. acid complexed by beads |

*0.1048 N salicyclic acid used in lieu of 0.1013 N acid

EXAMPLE 14

Pasteurized ruh stage beer from Carlings Brewery, Cleveland, Ohio, was continuously circulated at 44.6°F. through a glass column containing beads of Example 5. Two periods of treatment, 2.5 and 5.0 hours, were employed at a flow rate of 38 ml. per minute. The treatment level was 6 lbs. per 100 barrels of beer. Seven cycles were completed alternating fresh beer and eluting the phenolic constituents adsorbed with 0.1 N NaOH. Residual NaOH was removed between cycles by washing with water. Effluent beer was tested for removal of chill-haze factors by subjecting samples to the standard 3-cycle heat-chill test and measuring turbidity on the CBL haze meter. The results of the 7 cycles of cartridge treatment and the 3 cycles of beer haze testing are shown in Table 11. As it apparent, there is no observable loss of preclarifying activity with respect to chill-haze precursors or irreversible build-up of materials on the beads during 7 cycles of continuous operation.

beads as a flavor-improving absorbant or pre-clarifying agent in vegetable extracts or beverages, e.g., beer, wine, juices, decoctions, vinegars, or similar beverages of raw, fermented, cooked, alcoholic, non-alcoholic, etc. types.

Thus, when compared to the fine powder materials employed in the prior art (slow filtration rate) the crosslinked porous, granules or beads of polymer have the ability of being employed in packed column or filtration purification systems where rapid throughput is available. Further advantages and economics are offered by the feature of regeneration of the resin as it becomes loaded with absorbates.

While the present invention has been described primarily with respect to the foregoing specific examples, it is to be understood that other variations and modifications of the described process which will be obvious to those skilled in the art can be made in this invention without departing from the scope or spirit thereof. Further, the process also lends itself to similar treatment of liquids equivalent to the above-described beverages and extracts.

We claim:

1. A process for clarifying and improving vegetable and similar beverages which comprise contacting such a beverage with a water-insoluble, water-swellable crosslinked polymer in a porous granular or bead form wherein said polymer is selected from the group consisting of N-vinyllactam and N-alkyl-N-vinylamide

TABLE 11

CONTINUOUS CARTRIDGE CYCLING OF RUH STAGE BEER THROUGH CROSSLINKED PVP BEADS (EXAMPLE 5)

| Cycle No. | Sampling Time./Hrs. | Original CBL | Original Formazin | 1 Cycle CBL | 1 Cycle Formazin | 2 Cycles CBL | 2 Cycles Formazin | 3 Cycles CBL | 3 Cycles Formazin | PPM PVP Present | Percent Anthocyanogen Removal |
|---|---|---|---|---|---|---|---|---|---|---|---|
| 1 | 2½ | 6.0 | 41.4 | 5.5 | 38.0 | 14.2 | 98.0 | 8.3 | 57.3 | 39±4 | 85.8 |
|   | 5 | 9.6 | 66.2 | 11.0 | 75.9 | 20.6 | 142.1 | 11.7 | 80.7 | 50± | 88.4 |
|   | Control | 5.2 | 35.9 | >40 | >276 | — | — | — | — | — | — |
| 2 | 2½ | 10.0 | 69.0 | 20.3 | 140.1 | 10.8 | 74.5 | 12.4 | 85.6 | None | 54.4 |
|   | 5 | 7.8 | 53.8 | 11.0 | 75.9 | 13.1 | 90.4 | 13.6 | 93.8 | 1.5±2 | 71.9 |
|   | Control | 11.0 | 75.9 | >40 | >276 | — | — | — | — | — | — |
| 3 | 2½ | 13.4 | 92.5 | 18.5 | 127.7 | 22.8 | 157.3 | 23.0 | 158.7 | 2.0±2 | 42.9 |
|   | 5 | 7.0 | 48.3 | 7.0 | 48.3 | 7.5 | 51.8 | 7.8 | 53.8 | 5.0±2 | 66.1 |
|   | Control | 29.2 | 201.5 | >40 | >276 | — | — | — | — | — | — |
| 4 | 2½ | 13.4 | 89.7 | 16.0 | 110.4 | 21.9 | 151.1 | 22.1 | 152.5 | 1.5±2 | 41.4 |
|   | 5 | 7.3 | 50.4 | 11.8 | 81.4 | 12.2 | 84.2 | 12.8 | 88.3 | 1.5±2 | 72.4 |
|   | Control | 31.1 | 214.6 | >40 | >276 | — | — | — | — | — | — |
| 5 | 2½ | 19.7 | 135.9 | 20.1 | 138.7 | 22.7 | 156.6 | | | None | 44.3 |
|   | 5 | 11.0 | 75.9 | 11.3 | 78.0 | 16.0 | 110.4 | | | None | 70.5 |
|   | Control | >40 | >276 | >40 | >276 | — | — | | | — | — |
| 6 | 2½ | 22.0 | 151.8 | 31.0 | 213.3 | >40 | >276 | | | None | 31.2 |
|   | 5 | 9.4 | 64.9 | 11.2 | 77.3 | 20.6 | 142.1 | | | 1.5±2 | 72.1 |
|   | Control | 30.4 | 209.8 | >40 | >276 | — | — | | | — | — |
| 7 | 2½ | 12.3 | 84.9 | 20.6 | 142.1 | 22.2 | 153.2 | | | 2.0±2 | 43.5 |
|   | 5 | 7.4 | 51.1 | 7.6 | 52.4 | 10.2 | 70.4 | | | 1.5±2 | 72.6 |
|   | Control | >40 | >276 | — | — | — | — | | | — | — |

The term pre-clarifying, is used herein to describe the removal from the extracts or beverages of precursor materials which may, upon later aging and/or cooling, cause a lack of clarity of the liquid. In brewing circles, this lack of clarity is called "chill-haze."

The process of the present invention is applicable when employing a water-insoluble but water-swellable crosslinked N-vinyllactam or N-alkyl-N-vinylamide polymer in the form of porous crosslinked granules or polymers and said crosslinking agent contains at least two functional groups capable of taking part in the polymerization reaction to provide a crosslinked three-dimensional structure, thereafter separating the beverage from the polymer and regenerating said polymer beads by elution of any absorbate present thereon.

2. The process of claim 1, wherein said regeneration and elution result from contacting the beads with an aqueous alkaline medium.

3. The process of claim 1, wherein said porous granules or beads before drying have a diameter of from about 1 to about 7 millimeters.

4. The process of claim 1 wherein said beverage is an aqueous extract or decoction.

5. The process of claim 1 wherein said beverage is a fruit juice.

6. The process of claim 1 wherein said beverage is beer.

7. The process of claim 1 wherein said beverage is wine.

8. The process of claim 1 wherein the N-vinyllactam monomer is selected from those having the formula:

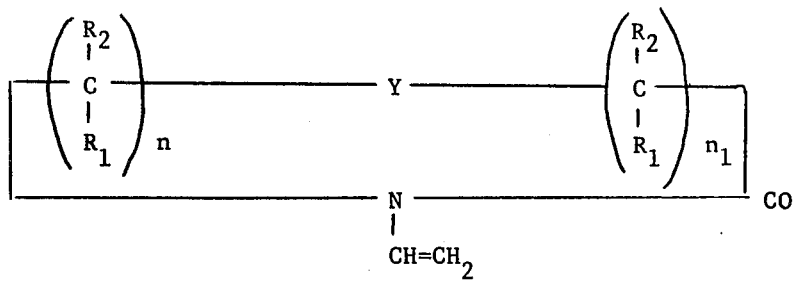

9. The process of claim 1 wherein the N-vinyllactam is N-vinyl pyrrolidone crosslinked with about 5% by weight of divinylbenzene, said crosslinking and polymerization taking place in an aqueous solution of an electrolyte.

10. The process according to claim 9 wherein said regeneration and elution step is performed with solutions of sodium hydroxide dilute.

11. A process according to claim 1 for improving vegetable liquid extracts which comprise percolating said extracts through a bed of water-insoluble, water-swellable porous granules of a crosslinked vinyl-2-pyrrolidone polymer at a rate sufficient to remove from said extracts substantial portions of the phenolic and polyphenolic components responsible for degrading said extracts and subsequently regenerating said granules by contacting same with an aqueous alkaline solution to elute said phenols and polyphenols wherein said crosslinked polymer granules are prepared by polymerizing in the presence of a free radical initiator a monomeric mixture comprising a major portion of N-vinyl pyrrolidone with at least 2.5 to 20% by weight of a crosslinking agent containing at least two functional groups capable of reacting to form a crosslinked network with said N-vinyl pyrrolidone, said polymerization taking place in a concentrated aqueous solution of an electrolyte, the resulting polymers precipitating from said aqueous electrolyte solution in the form of a water-insoluble, water-swellable, porous granules substantially free from any soluble N-vinyl pyrrolidone or polyvinylpyrrolidone and of sufficient resilience to form a percolation medium that permits the passage of said vegetable liquid extract therethrough.

12. The process according to claim 11 wherein said crosslinking agent is divinylbenzene.

* * * * *